(12) United States Patent
Case et al.

(10) Patent No.: US 11,511,813 B2
(45) Date of Patent: Nov. 29, 2022

(54) TIRE SKIRT SUPPORT ASSEMBLY FOR COMPACTOR

(71) Applicant: Caterpillar Paving Products Inc., Brooklyn Park, MN (US)

(72) Inventors: Aaron M. Case, St. Michael, MN (US); Brian D. Nagel, Ramsey, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 711 days.

(21) Appl. No.: 16/562,600

(22) Filed: Sep. 6, 2019

(65) Prior Publication Data

US 2021/0070373 A1    Mar. 11, 2021

(51) Int. Cl.
*B62D 25/16* (2006.01)
*E01C 19/27* (2006.01)
*E01C 19/23* (2006.01)
*E01C 19/26* (2006.01)

(52) U.S. Cl.
CPC .......... *B62D 25/163* (2013.01); *E01C 19/238* (2013.01); *E01C 19/26* (2013.01); *E01C 19/27* (2013.01)

(58) Field of Classification Search
CPC ........ E01C 19/238; E01C 19/26; E01C 19/27; B62D 25/163
USPC .................................................. 404/82, 117
See application file for complete search history.

(56) References Cited

U.S. PATENT DOCUMENTS

| | | | |
|---|---|---|---|
| 3,891,342 A * | 6/1975 | Roe | E02D 3/032 37/444 |
| 4,641,574 A | 2/1987 | Chesnut | |
| 9,630,657 B2 | 4/2017 | Ries | |
| 2008/0292401 A1 * | 11/2008 | Potts | E01C 19/238 404/95 |
| 2016/0076206 A1 | 3/2016 | Ries | |

FOREIGN PATENT DOCUMENTS

WO    2019073276    4/2019

* cited by examiner

*Primary Examiner* — Raymond W Addie

(57) ABSTRACT

A tire skirt support assembly for a compactor comprising a bracket and one or more skirt support members. The bracket can be oriented horizontally, and each skirt support member can have a body that is elongate with a first end and a second end opposite the first end. For each said skirt support member, the first end can be fixed to the bracket, and the second end can be below the bracket and is a free end configured to removably engage a skirt via an attachment opening in the skirt.

20 Claims, 5 Drawing Sheets

TIRE SKIRT SUPPORT ASSEMBLY FOR COMPACTOR

TECHNICAL FIELD

The present disclosure relates to skirt assemblies for compactors, and more particularly to tire skirt support assemblies for compactors, and systems, components and methods thereof.

BACKGROUND

A tire skirt may be supported by a lower support structure in the form of a horizontally extending bar provided at an inner face of the tire skirt. The horizontally extending bar can be susceptible to damage and may be difficult or inconvenient to repair.

U.S. Pat. No. 9,630,657 ("the '657 patent") describes a tire skirt system for a compactor machine. The '657 patent describes that the machine includes a frame having a front frame end and a back frame end. The '657 patent also describes that the machine includes a front compactor member and a rear compactor member rotatably coupled to the frame. According to the '657 patent, the machine also includes front and rear tire skirt systems each having a skirt for covering and retaining heat around the tires of the corresponding compacting member. FIG. 1 of the '657 patent shows a horizontally extending bar at the rear tire skirt system.

SUMMARY OF THE DISCLOSURE

In one aspect, a tire skirt support assembly for a compactor is disclosed. The tire skirt support assembly can comprise a bracket, the bracket being oriented horizontally; and one or more skirt support members, each said skirt support member having a body that is elongate with a first end and a second end opposite the first end. For each said skirt support member: the body extends vertically from the bracket, the first end is fixed to the bracket, the second end is below the bracket and is a free end configured to removably engage a skirt via an attachment opening of the skirt, and the second end forms a bottom-most part of the tire skirt support assembly.

In another aspect, a tire skirt system for a compacting machine is disclosed. The tire skirt system can comprise a skirt having a plurality of attachment openings; a bracket, the bracket being oriented horizontally; and a plurality of skirt support members, each said skirt support member having a body that is elongate with a first end and a second end opposite the first end. For each said skirt support member: the first end is fixed to the bracket, the second end is below the bracket and is a free end removably coupled to the skirt via only one of the attachment openings, and the second end is at a height above a bottom edge of the skirt.

And in yet another aspect, a pneumatic compactor is disclosed. The pneumatic compactor can comprise a body; a front compactor member including one or more front pneumatic tires; a rear compactor member including one or more rear pneumatic tires; a front tire skirt system configured to protect the one or more front pneumatic tires; and a rear tire skirt system configured to protect the one or more rear pneumatic tires. Each of the front tire skirt system and the rear tire skirt system includes a tire skirt support assembly has: a bracket, the bracket being oriented horizontally, and a plurality of skirt support members, each said skirt support member having a body that is elongate with a first end and a second end opposite the first end. For each said skirt support member: the body extends vertically from the bracket, the first end is fixed to the bracket, and the second end is below the bracket and is a free end configured to removably engage a skirt via an attachment opening of the skirt.

Other features and aspects of this disclosure will be apparent from the following description and the accompanying drawings.

DETAILED DESCRIPTION

As noted above, embodiments of the present disclosure relate to tire skirt support assemblies for compactors, and systems, components and methods thereof.

Figure 1:
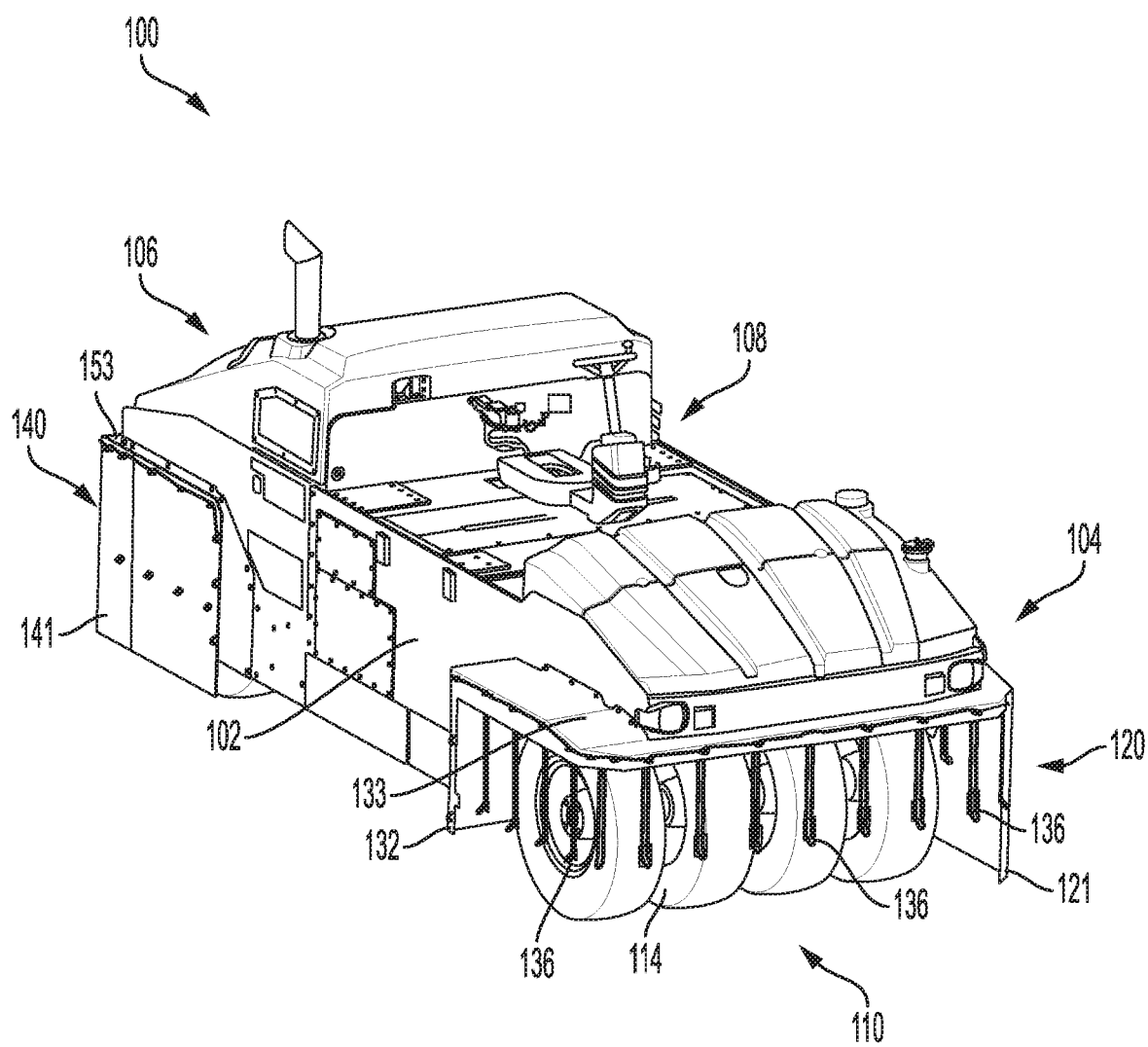
FIG. 1 is a front perspective view of a compactor according to embodiments of the disclosed subject matter.
Figure 2:
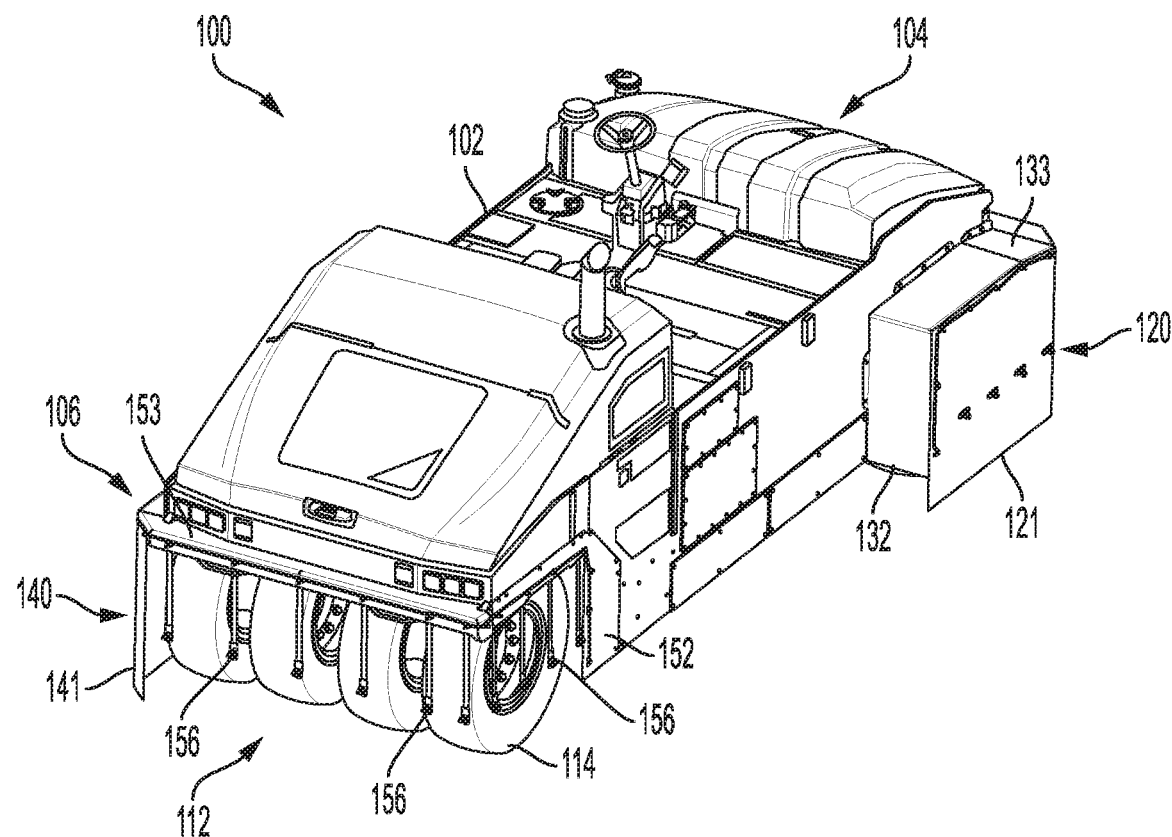
FIG. 2 is a rear perspective view of the compactor of FIG. 1.

Referring now to the drawings and with specific reference to FIG. 1 and FIG. 2, a machine according to embodiments of the disclosed subject matter is generally referred to by reference numeral 100. While the machine 100 is depicted as a pneumatic compactor, specifically a pneumatic wheel roller-style compactor, it is to be understood that the teachings of this disclosure can be employed with equal efficacy on other types of machines (including other types of compactors) that may implement skirts.

The machine 100 can include a body 102 having an operator control station 108 provided between a front 104 of the machine 100 and a rear 106 of the machine 100. The machine 100 can further include a front compacting member 110 and a rear compacting member 112.

Both the front compacting member 110 and the rear compacting member 112 can be rotatably coupled to the body 102 and have an outer surface configured to rotate in contact with a substrate of paving material beneath the machine 100. For example, as shown, each of the front compacting member 110 and the rear compacting member 112 can have one or more pneumatic tires 114. The machine 100 of FIG. 1 and FIG. 2 shows, as a non-limiting example, four pneumatic tires 114 for each of the front compacting member 110 and the rear compacting member 112. Thus, in one or more embodiments, the number of pneumatic tires 114 for the front compacting member 110 and the rear compacting member 112 can match. Alternatively, the number of pneumatic tires 114 may not match. Of course, one of skill in the art will appreciate that machine 100 can include any type of compactor employing any type of ground engaging member, such as tires, tracks, drums, rollers, or combination thereof.

The machine 100 can further include a front tire skirt system 120 and/or a rear tire skirt system 140. That is, in one or more embodiments, such as shown in FIG. 1 and FIG. 2, the machine 100 can include both the front tire skirt system 120 and the rear tire skirt system 140. Alternatively, the machine 100 may include only one of the front tire skirt system 120 or the rear tire skirt system 140.

The front tire skirt system 120 can include a skirt 121. Likewise, the rear tire skirt system 140 can include a skirt 141. Each of the skirt 121 and the skirt 141 can be made of any suitable material, such as metal, plastic, rubber, or vinyl.

Each of the skirt 121 and the skirt 141 can be in the form of one or more panels, for instance, a rigid or semi-rigid panel. Discussed in more detail below with reference to FIG. 4 and FIG. 5, the skirt 121 can include a plurality of skirt attachment openings 122. Likewise, as discussed in more detail below with reference to FIG. 7, the skirt 141 can include a plurality of skirt attachment openings 142.

Generally, the skirt 121 can provide covering for the pneumatic tires 114 of the front compactor member 110, and the skirt 141 can provide covering for the pneumatic tires 114 of the rear compactor member 112. The skirts 121, 141 can extend to a predetermined level to cover a predetermined portion of the pneumatic tires 114. For example, the skirts 121, 141 may extend such that a bottom edge thereof is at one-quarter the height of the pneumatic tires.

The skirt 121 can be comprised of a plurality of skirt sections. FIG. 1, for instance, shows the skirt 121 provided as a skirt section at the front left side of the machine 100. However, skirt 121 may be additionally comprised of a skirt section at the front of the machine 100 and a skirt section at the front right side of the machine 100. Such additional skirt sections are not expressly shown in FIG. 1 in order to show underlying support structure discussed in detail below. The skirt sections may be arranged relative to each other (e.g., adjacent or overlapping) such that no gap or space exists between adjacent skirt sections. Additionally, as is apparent, the skirt sections of the skirt 121 may face different directions. For example, a front left side skirt section may face in a direction opposite to a direction at which the front right side skirt section faces, particularly, outward from the left side of the machine 100 and outward from the right side of the machine 100, respectively. Alternatively, the skirt 121 may be a single unit provided at the front 104 of the machine 100 to cover the front and right and left sides thereof. In any case, the tires 114 of front compacting member 110 can be enclosed (partially) by the skirt 121 of the front tire skirt system 120, whether the skirt 121 is a one-piece configuration or comprised of a plurality of skirt sections.

Figure 7:
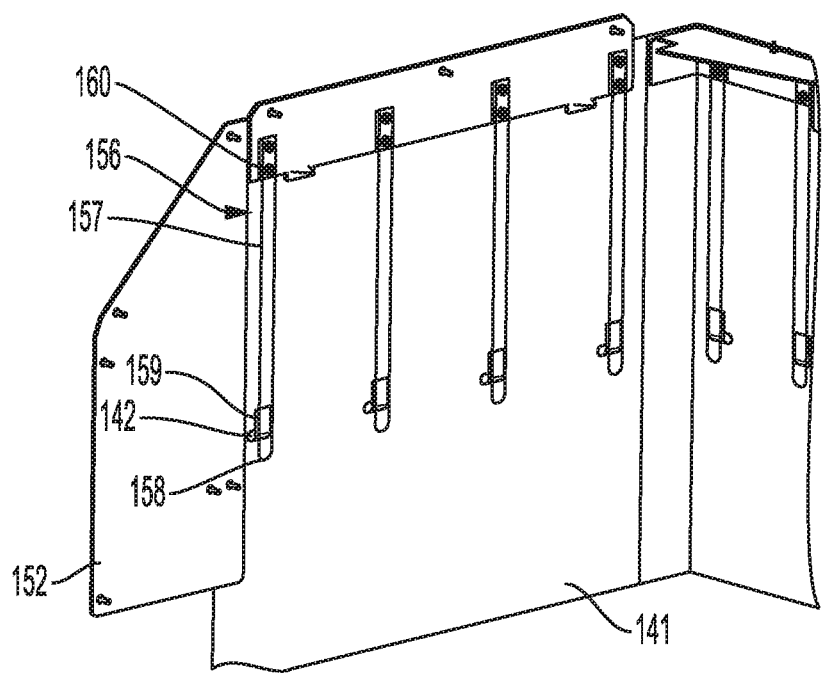
FIG. 7 is a partial inside view of a portion of a rear tire skirt system according to embodiments of the disclosed subject matter.

The skirt 141 of the rear tire skirt system 140 can also be comprised of a plurality of skirt sections, such as shown in FIG. 2 and FIG. 7. FIG. 2 does not expressly show skirt sections at the rear of the machine 100 and the rear right side of the machine 100 in order to show underlying support structure discussed in detail below. However, skirt sections of the skirt 141 may be provided at the rear and rear right side of the machine 100. The skirt sections may be arranged relative to each other (e.g., adjacent or overlapping) such that no gap or space exists between adjacent skirt sections. Like skirt 121, skirt 141 may also have skirt sections that face different directions. Alternatively, the skirt 141 may be a single unit provided at the rear 106 of the machine 100 to cover the rear and right and left sides thereof. In any case, the tires 114 of rear compacting member 112 can be enclosed (partially) by the skirt 141 of the rear tire skirt system 140, whether the skirt 141 is a one-piece configuration or comprised of a plurality of skirt sections.

The front tire skirt system 120 can also include a tire skirt support assembly, which may be comprised of a front side skirt bracket 132, a front top skirt bracket 133, and one or more skirt support members 136. FIG. 1, for instance, shows a plurality of individual skirt support members 136 separated from each other by a predetermined distance. Optionally, the skirt support members 136 may be uniformly spaced from each other in a horizontal or lateral direction. Alternatively, the spacing may not be uniform for all adjacent skirt support members 136, such as at a transition from a side skirt support member 136 to a front skirt support member 136.

The front side skirt bracket 132 and the front top skirt bracket 133 can extend outward from the body 102 of the machine 100 in a direction generally perpendicular to the plane of the body 102 from the front 104 to the rear 106 of the machine 100. FIG. 1, for instance, shows that the front side skirt bracket 132 and the front top skirt bracket 133 can extend outwardly far enough from the body 102 to partially surround an outermost pneumatic tire 114 that may extend out from under the body 102 of the machine 100. In side and front elevational views of the machine 100, the front top skirt bracket 133 can run or otherwise be oriented horizontally or substantially horizontally (e.g., a portion of the front top skirt bracket 133 can have a transition from one horizontal portion at one height to another horizontal portion at another height, such as when transitioning from the side to the front of the machine 100).

Generally, the front side skirt bracket 132 and front top skirt bracket 133 can provide support for the skirt 121, and the front top skirt bracket 133 can provide support for the skirt support members 136.

Figure 3:
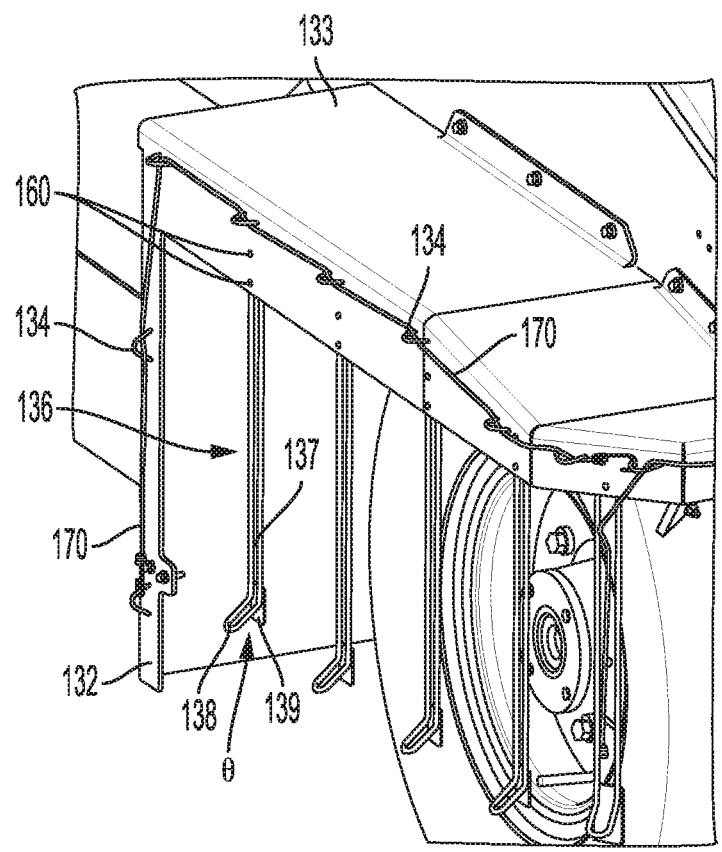
FIG. 3 is an enlarged view of a front portion of the compactor of FIG. 1 showing aspects of a tire skirt support assembly according to embodiments of the disclosed subject matter.

Each of the front side skirt bracket 132 and the front top skirt bracket 133 can have one or more skirt attachment interfaces 134. In one or more embodiments, the skirt attachment interfaces 134 can be projections in the form of loops that project outward from the corresponding bracket. Further, the skirt attachment interfaces 134 can be sized, positioned, and oriented based on corresponding skirt attachment openings 122 of the skirt 121. FIG. 3, for instance, shows horizontally oriented skirt attachment interfaces 134 on the front top skirt bracket 133 and vertically oriented skirt attachment interfaces 134 on the front side skirt bracket 132.

Figure 5:
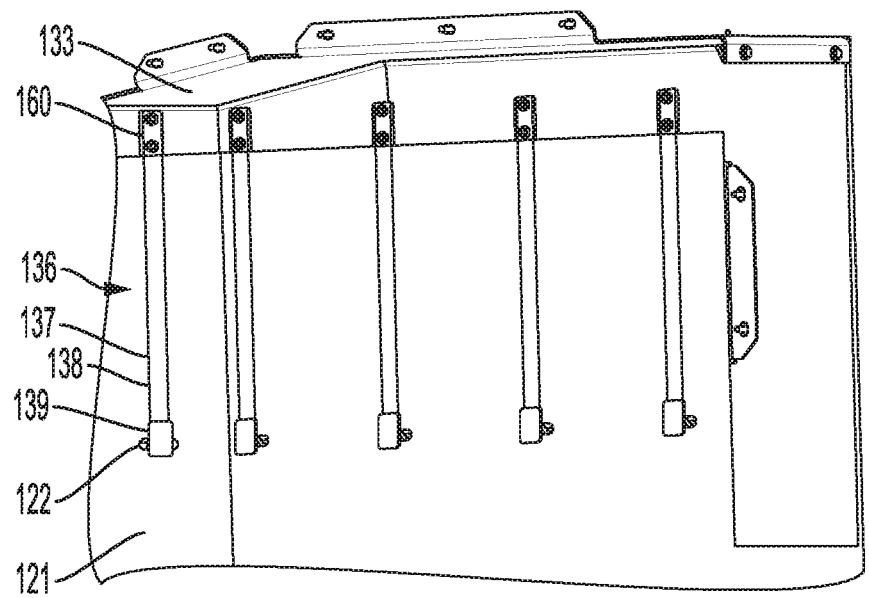
FIG. 5 is a partial inside view of a portion of the front tire skirt system of FIGS. 1-4.

The skirt 121 can be coupled to the front side skirt bracket 132 and the front top skirt bracket 133, such as shown in FIGS. 1, 2, and 5, via interface with the skirt attachment interfaces 134. Alternatively, portions of the skirt 121 (e.g., the top edge) may be coupled to the front top skirt bracket 133 via one or more fasteners, such as fasteners 160. In one or more embodiments, the skirt 121 can be removably coupled to the front side skirt bracket 132 and/or the front top skirt bracket 133. Thus, the skirt 121 can be attached to and detached from the front side skirt bracket 132 and/or the front top skirt bracket 133.

The skirt support members 136 may be grouped according to sets. For example, all of the skirt support members 136 of the front tire skirt system 120 may be grouped as a set of skirt support members 136. As shown in FIG. 1, all of the skirt support members 136 may be of a same configuration or type. Additionally or alternatively, the skirt support members 136 of the front tire skirt system 120 may themselves be grouped into different sets. For example, skirt support members 136 at the right side of the machine 100 may be considered a first set of skirt support members 136, skirt support members 136 at the left side of the machine 100 may be considered a second set of skirt support members 136, and skirt support members 136 at the front 104 of the machine 100 may be considered a third set of skirt support members 136. Thus, in one or more embodiments, skirt support members 136 of a same set (i.e., subset of the skirt support members 136 of the front tire skirt system 120) may face the same direction, and skirt support members 136 of different sets of may face different directions. Optionally, different skirt sections of the skirt 121 may be associated with different sets of skirt support members 136.

Referring now to FIG. 3, each skirt support member 136 can have a body 137 with a first end and a second end opposite the first end. The body 137 can be rigid or semi-rigid and, as shown, elongate. Moreover, the body 137 may be in the form of one or more plates, bars, or rods. FIG. 3, for instance, shows the body 137 in the form of a bent rod or bar having two parallel rod or bar portions extending (upward) from a vertex or interface at the second end. Alternatively, the body 137 can be an elongate plate or bar.

As shown in FIG. 1 and FIG. 3, the body 137 can extend from the front top skirt bracket 133. More specifically, the first end of the body 137 can be fixed to the front top skirt bracket 133 via one or more fasteners, such as fastener 160 shown in FIG. 3 and FIG. 5, and the second end of the body 137 can be below the front top skirt bracket 133. Moreover, the body 137 can extend vertically (including substantially vertically ~0-5°) from the front top skirt bracket 133.

As can be seen from FIG. 1 and FIG. 3, the second end of the skirt support member 136 can be a free end. Thus, a horizontal bar that spans two or more second ends of the bodies 137 is not provided. Optionally, no part of any skirt support member 136 touches any part of any other skirt support member 136.

In some respects, the second end of the body 137 may form a bottom-most part of the tire skirt support assembly. The front side skirt bracket 132, however, may extend below the second ends of the bodies 137. Additionally, as shown in FIG. 1 and FIG. 5, the second ends of the bodies 137 can be at a height above a bottom edge of the skirt 121. Optionally, a middle portion of each body 137 can be below the front top skirt bracket 133.

Figure 4:
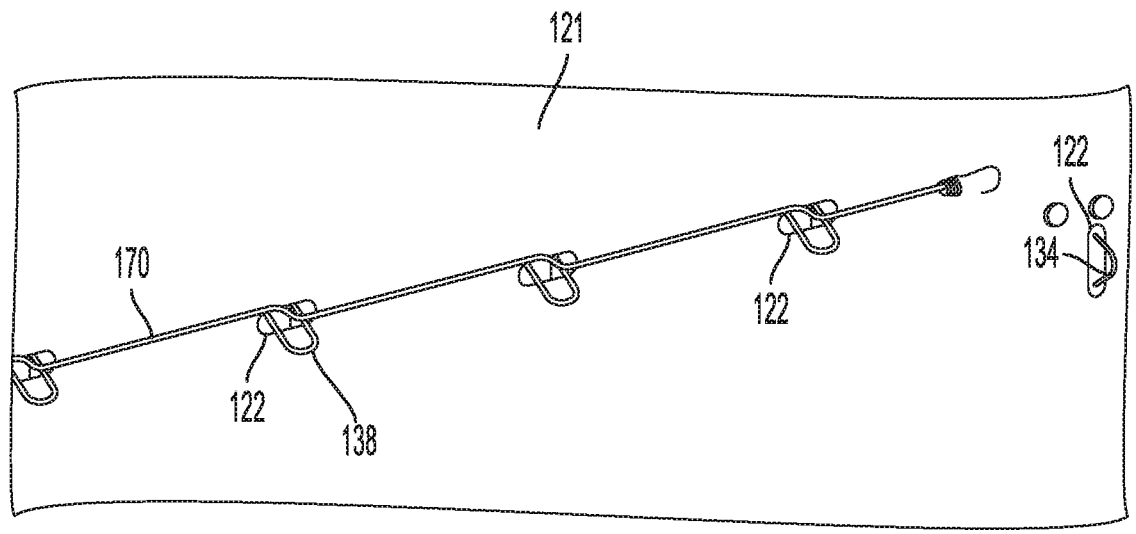
FIG. 4 is an enlarged view of a front face of a skirt and a portion of the tire skirt support assembly of FIG. 3 of a front tire skirt system according to embodiments of the disclosed subject matter.

The second end of the body 137 can have an engagement or coupling interface for engaging or coupling to the skirt 121. For example, FIG. 3 and FIG. 5 show the second end of the body 137 having a prong or tongue 138 and a flange 139. The prong 138 may be an outwardly bent portion of the body 137. Further, the prong 138 may be configured to extend through a skirt attachment opening 142, such as shown in FIG. 4. The flange 139 may be a plate and may be fixedly coupled to the second end of the body 137, for instance, via welding or a strong adhesive.

The prong 138 and the flange 139 can be provided at an angle θ relative to each other. According to one or more embodiments, the angle θ may be an acute angle. FIG. 3 and FIG. 5 also show that the flange 139 can be extend vertically in a same direction as the body 137.

The rear tire skirt system 140 can also include a tire skirt support assembly, which may be comprised of a rear side skirt bracket 152, a rear top skirt bracket 153, and one or more individual skirt support members 156. FIG. 2, for instance, shows a plurality of individual skirt support members 156 separated from each other by a predetermined distance. Optionally, the skirt support members 156 may be uniformly spaced from each other in a horizontal or lateral direction. Alternatively, the spacing may not be uniform for all adjacent skirt support members 156, such as at a transition from a side skirt support member 156 to a rear skirt support member 156.

Figure 6:
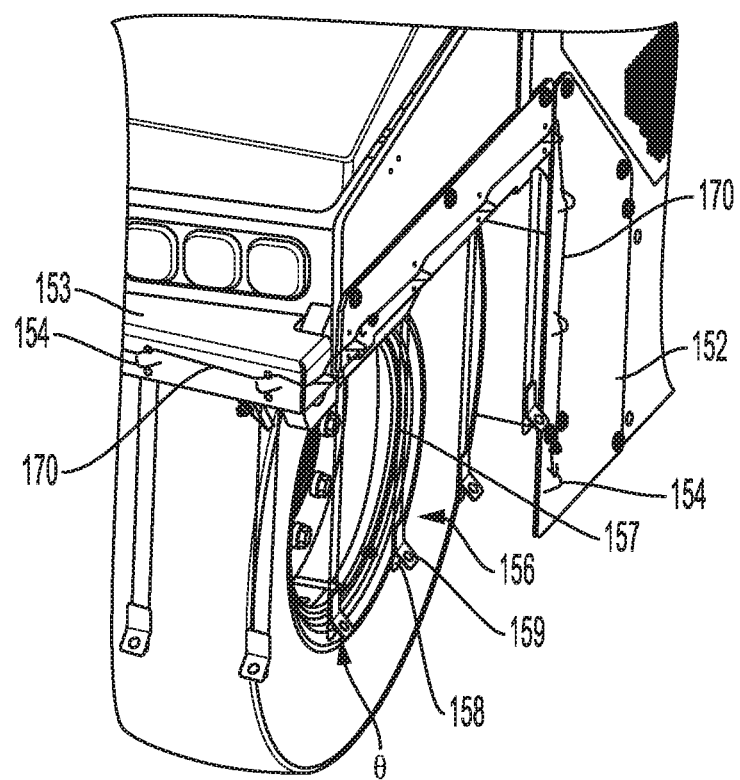
FIG. 6 is an enlarged view of a rear portion of the compactor of FIG. 1 showing aspects of a tire skirt support assembly according to embodiments of the disclosed subject matter.

The rear side skirt bracket 152 and the rear top skirt bracket 153 can extend outward from the body 102 of the machine 100 in a direction generally perpendicular to the plane of the body 102 from the front 104 to the rear 106 of the machine 100. In FIG. 2 and FIG. 6, for instance, the rear side skirt bracket 152 and the rear top skirt bracket 153 can extend outwardly far enough from the body 102 to partially surround an outermost pneumatic tire 114 that may extend out from under the body 102 of the machine 100. In side and rear elevational views of the machine 100, the rear top skirt bracket 153 can run or otherwise be oriented horizontally or substantially horizontally (e.g., a portion of the rear top skirt bracket 153 can have a transition from one horizontal portion at one height to another horizontal portion at another height, such as when transitioning from the side to the rear of the machine 100).

Generally, the rear side skirt bracket 152 and rear top skirt bracket 153 can provide support for the skirt 141, and the rear top skirt bracket 153 can provide support for the skirt support members 156.

Each of the rear side skirt bracket 152 and the rear top skirt bracket 153 can have one or more skirt attachment interfaces 154. In one or more embodiments, the skirt attachment interfaces 154 can be projections in the form of loops that project outward from the corresponding bracket. Further, the skirt attachment interfaces 154 can be sized, positioned, and oriented based on corresponding skirt attachment openings 142 of the skirt 141. FIG. 6, for instance, shows horizontally oriented skirt attachment interfaces 154 on the rear top skirt bracket 153 and vertically oriented skirt attachment interfaces 154 on the rear side skirt bracket 152.

The skirt 141 can be coupled to the rear side skirt bracket 152 and the rear top skirt bracket 153, such as shown in FIGS. 2 and 7, via interface with the skirt attachment interfaces 154. Alternatively, portions of the skirt 141 (e.g., the top edge) may be coupled to the rear top skirt bracket 153 via one or more fasteners, such as fasteners 160. In one or more embodiments, the skirt 141 can be removably coupled to the rear side skirt bracket 152 and/or the rear top skirt bracket 153. Thus, the skirt 141 can be attached to and detached from the rear side skirt bracket 152 and/or the rear top skirt bracket 153.

The skirt support members 156 may be grouped according to sets. For example, all of the skirt support members 156 of the rear tire skirt system 140 may be grouped as a set of skirt support members 156. According to one or more embodiments, the skirt support members 156 may be considered a first set or group of skirt support members and the skirt support members 136 (of the front tire skirt system 120) may be considered a second set or group of skirt support members or vice versa. Additionally or alternatively, the skirt support members 156 of the rear tire skirt system 140 may themselves be grouped into different sets. For example, skirt support members 156 at the right side of the machine 100 may be considered a first set of skirt support members 156, skirt support members 156 at the left side of the machine 100 may be considered a second set of skirt support members 156, and skirt support members 156 at the rear 106 of the machine 100 may be considered a third set of skirt support members 156. Thus, in one or more embodiments, skirt support members 156 of a same set (i.e., subset of the skirt support members 156 of the rear tire skirt system 140) may face the same direction, and skirt support members 156 of different sets of may face different directions. Optionally, different skirt sections of the skirt 141 may be associated with different sets of skirt support members 156. As shown in FIG. 2, all of the skirt support members 156 may be of a same configuration or type.

Referring now to FIG. 6, each skirt support member 156 can have a body 157 with a first end and a second end opposite the first end. The body 157 can be rigid or semi-rigid and, as shown, elongate. Moreover, the body 157 may be in the form of one or more plates, bars, or rods. FIG. 6, for instance, shows the body 157 in the form of a bent rod or bar having two parallel rod or bar portions extending (upward) from a vertex or interface at the second end. Alternatively, the body 157 can be an elongate plate or bar.

As shown in FIG. 2 and FIG. 6, the body 157 can extend from the rear top skirt bracket 153. More specifically, the first end of the body 157 can be fixed to the rear top skirt bracket 153 via one or more fasteners, such as fastener 160 shown in FIG. 6 and FIG. 7, and the second end of the body 157 can be below the rear top skirt bracket 153. Moreover, the body 157 can extend vertically (including substantially vertically ~0-5°) from the rear top skirt bracket 153.

As can be seen from FIG. 2 and FIG. 6, the second end of the skirt support member 156 can be a free end. Thus, a horizontal bar that spans two or more second ends of the bodies 157 is not provided. Optionally, no part of any skirt support member 156 touches any part of any other skirt support member 156.

In some respects, the second end of the body 157 may form a bottom-most part of the tire skirt support assembly. The rear side skirt bracket 152, however, may extend below the second ends of the bodies 157. Additionally, as shown in FIG. 2 and FIG. 7, the second ends of the bodies 157 can be at a height above a bottom edge of the skirt 141. Optionally, a middle portion of each body 157 can be below the rear top skirt bracket 153.

The second end of the body 157 can have an engagement or coupling interface for engaging or coupling to the skirt 141. For example, FIG. 6 and FIG. 7 show the second end of the body 157 having a prong or tongue 158 and a flange 159. The flange 159 may be in the form of a bent plate with a base and an outwardly extending portion. The outwardly extending portion of the flange 159 may be a free end that defines an opening. The base of the flange 159 may be fixedly coupled to a portion of the body 157 at or near the second end of the body 157, for instance, via welding or a strong adhesive.

The prong 158 and the flange 159, particularly the outwardly extending portion of the flange 159, can be provided at an angle θ relative to each other. According to one or more embodiments, the angle θ may be an acute angle. FIG. 2, FIG. 6, and FIG. 7 also show that the prong 158 can be extend vertically in a same direction as the body 157.

INDUSTRIAL APPLICABILITY

As noted above, the present disclosure relates to tire skirt support assemblies for compactors, and systems, components and methods thereof.

A front tire skirt system 120 and/or a rear tire skirt system 140 can include a first 121 and a skirt 141, respectively. The skirt 121 can provide covering for the pneumatic tires 114 of a front compactor member 110, and the skirt 141 can provide covering for the pneumatic tires 114 of a rear compactor member 112. Such coverings can protect the pneumatic tires 114 from external influences and can retain heat around the pneumatic tires 114. Retaining heat around the pneumatic tires 114 may prevent paving material (e.g., asphalt) from sticking to the pneumatic tires 114.

The skirt 121 and the skirt 141 may be removed in whole or in part from the machine 100. Thus, according to one or more embodiments, the skirt 121 and/or the skirt 141 can be comprised of a plurality of skirt sections that are separately removable (and attachable) to respective tire skirt support assemblies of the front tire skirt system 120 and the rear tire skirt system 140.

One or more skirt support members may be provided, for instance, skirt support members 136 for the skirt 121 and skirt support members 156 for the skirt 141, which can extend vertically (or substantially vertically) from front top skirt bracket 133 and rear top skirt bracket 153, respectively. In that the second ends of the skirt support members 136, 156 can be free ends, the skirt support members 136, 156 may be characterized as hanging from the respective top brackets 133, 153.

Generally, the second ends of the bodies 137 of the skirt support members 136 and the second ends of the bodies 157 of the skirt support members 156 can be configured to removably engage with or be removably coupled to the skirt 121 and the skirt 141, respectively. In particular, the second ends of the bodies 137, 157 can engage the skirt 121, 141 via skirt attachment openings 122, 142. More specifically, each of the skirt support members 136, 156 can have prong 138, 158 and flange 139, 159 at the second end thereof, where the configuration of the prong 138, 158 and the flange 139, 159 can engage the skirt 121, 141 via the skirt attachment openings 122, 142.

In the case of skirt support members 136, the prong 138 and the flange 139 can engage the skirt 121 such that the prong 138 extends through the skirt attachment opening 122 while a portion of the body 137 above the prong 138 can abut or be adjacent to an inner face or side of the skirt 121 and a portion of the flange 139 can be provided adjacent to the inner face or side of the skirt 121, such as shown in FIG. 4 and FIG. 5. The interface between the prong 138 and the flange 139 (i.e., the vertex of the angle θ) can prevent the skirt 121 from moving upward on the body 137, to the vertically oriented portion thereof. Further, as shown, the second end of the body 137 can be removably coupled to the skirt 121 via only one skirt attachment opening 122. Moreover, each skirt attachment opening 122 can have a geometry based on the configuration of the second end of the body 137. For example, as shown in FIG. 4, the skirt attachment openings 122 can be elongate openings in the form of tabs or slots sized to receive a single prong 138.

In the case of skirt support members 156, the prong 158 and the flange 159 can engage the skirt 141 such that a portion of the flange 159 extends through the skirt attachment opening 142 while a portion of the body 157 above the flange 159 can abut or be adjacent to an inner face or side of the skirt 141 and a portion of the prong 158 can be provided adjacent to the inner face or side of the skirt 141, such as shown in FIG. 7. The interface between the prong 138 and the flange 139 (i.e., the vertex of the angle θ) can prevent the skirt 141 from moving upward on the body 157, to the vertically oriented portion thereof. Further, as shown, the second end of the body 157 can be removably coupled to the skirt 141 via only one skirt attachment opening 142. Moreover, each skirt attachment opening 142 can have a geometry based on the configuration of the second end of the body 157. For example, as shown in FIG. 7, the skirt attachment openings 142 can be elongate openings in the form of tabs or slots sized to receive an outwardly extending portion of a single flange 159.

Once the skirt 121 is placed in position such that the skirt attachment interfaces 134 and the prongs 138 are mated with corresponding skirt attachment openings 122, the skirt 121 may be held in place by retainer 170. Likewise, once the skirt 141 is placed in position such that the skirt attachment interfaces 154 and the outwardly extending portions of the flanges 159 are mated with corresponding skirt attachment openings 142, the skirt 141 may be held in place by retainer 170.

Retainer 170 may be one or more cords (e.g., bungee cords), ropes, or wires that can be routed through the prongs 138 and the skirt attachment interfaces 134 in the case of the front tire skirt system 120 and through the skirt attachment interfaces 154 and the openings of the outwardly extending portions of the flanges 159. Ends of the retainer 170 may have fasteners (e.g., hooks) for coupling to a last one of the prongs 138 or skirt attachment interfaces 134 in the case of the front tire skirt system 120 and for coupling to a last one of the flanges 159 or skirt attachment interfaces 154 in the case of the rear tire skirt system 140. Alternatively, the top of the skirt 121 may be coupled to the front top skirt bracket 133 and/or the top of the skirt 141 may be coupled to the rear top skirt bracket 153 via one or more fasteners, such as fastener 160, and the bottom portion of the skirt 121, 141 (including edge at the side skirt bracket 132, 152) can be coupled to the skirt attachment interfaces 134, 154 and the prongs 138 or flanges 159, depending upon the configuration of the skirt support member.

The body 137, 157 of the skirt support member 136, 156 may be rigid or semi-rigid and optionally configured to return to an original shape or position upon release of a predetermined amount of bending force applied directly or indirectly to the skirt support member 136, 156. In that the skirt support member 136, 156 can be individual skirt support members, the skirt support members may be individually replaced or even omitted, allowing for remaining skirt support member 136, 156 to still provide support for the skirt 121, 141.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof

What is claimed is:

1. A tire skirt support assembly for a compactor comprising:
   a bracket, the bracket being oriented horizontally; and
   one or more skirt support members, each said skirt support member having a body that is elongate with a first end and a second end opposite the first end,
   wherein for each said skirt support member:
      the body extends vertically from the bracket,
      the first end is fixed to the bracket,
      the second end is below the bracket and is a free end configured to removably engage a skirt via an attachment opening of the skirt, and
      the second end forms a bottom-most part of the tire skirt support assembly.

2. The tire skirt support assembly of claim 1, wherein second end of the body of the skirt support member has a prong and a flange provided at an angle relative to each other, only one of the prong or the flange being configured to extend through the attachment opening of the skirt to removably engage the skirt, the other of the prong or the flange extending vertically in a same direction as the body.

3. The tire skirt support assembly of claim 2, wherein the angle is an acute angle.

4. The tire skirt support assembly of claim 2, wherein the prong is configured to extend through the attachment opening and the flange extends vertically in the same direction as the body.

5. The tire skirt support assembly of claim 2, wherein the flange is configured to extend through the attachment opening and the prong extends vertically in the same direction as the body.

6. The tire skirt support assembly of claim 1, wherein the one or more skirt support members include a plurality of said skirt support members.

7. The tire skirt support assembly of claim 6, wherein the skirt support members face a same direction.

8. The tire skirt support assembly of claim 6, wherein at least one of the skirt support members faces a first direction and at least one of the skirt support members faces a second direction different from the first direction.

9. The tire skirt support assembly of claim 6,
   wherein the plurality of said skirt support members are grouped as a first set of skirt support members and a second set of skirt support members,
   wherein the first set of skirt support members is adapted to protect one or more tires at a front of the compactor, and
   wherein the second set of skirt support members is adapted to protect one or more tires at a rear of the compactor.

10. The tire skirt support assembly of claim 9, wherein the skirt support members of the first set of skirt support members are all of a first configuration and the skirt support members of the second set of skirt support members are all of a second configuration different from the first configuration.

11. A tire skirt system for a compacting machine comprising:
    a skirt having a plurality of attachment openings;
    a bracket, the bracket being oriented horizontally; and
    a plurality of skirt support members, each said skirt support member having a body that is elongate with a first end and a second end opposite the first end,
    wherein for each said skirt support member:
       the first end is fixed to the bracket,
       the second end is below the bracket and is a free end removably coupled to the skirt via only one of the attachment openings, and
       the second end is at a height above a bottom edge of the skirt.

12. The tire skirt system according to claim 11, wherein the skirt support members are horizontally uniformly spaced to support the skirt.

13. The tire skirt system according to claim 11, wherein the skirt support members face a same direction.

14. The tire skirt system according to claim 11,
    wherein skirt support members of a first set of the skirt support members face a first direction,
    wherein skirt support members of a second set of the skirt support members face a second direction different from the first direction,
    wherein the skirt includes a first skirt section removably coupled to the first set of skirt support members and a second skirt section removably coupled to the second set of skirt support members, and wherein the first skirt section faces the first direction and the second skirt section faces the second direction.

15. The tire skirt system according to claim 11, wherein the second end of the body of the skirt support member has a prong and a flange provided at an angle relative to each other, only one of the prong or the flange extending through said one attachment opening to removably engage the skirt, the other of the prong or the flange extending vertically in a same direction as the body.

16. The tire skirt system according to claim 11, wherein each of the skirt support members is configured to return to an original shape upon release of a predetermined amount of bending force applied directly or indirectly to the skirt support member.

17. A pneumatic compactor comprising:

a body;

a front compactor member including one or more front pneumatic tires;

a rear compactor member including one or more rear pneumatic tires;

a front tire skirt system configured to protect the one or more front pneumatic tires; and a rear tire skirt system configured to protect the one or more rear pneumatic tires, wherein each of the front tire skirt system and the rear tire skirt system includes a tire skirt support assembly having:

a bracket, the bracket being oriented horizontally, and a plurality of skirt support members, each said skirt support member having a body that is elongate with a first end and a second end opposite the first end, and wherein for each said skirt support member:

the body extends vertically from the bracket, the first end is fixed to the bracket, and the second end is below the bracket and is a free end configured to removably engage a skirt via an attachment opening of the skirt.

18. The pneumatic compactor according to claim 17, wherein the skirt support members of the front tire skirt system are of a first configuration and the skirt support members of the rear tire skirt system are of a second configuration different from the first configuration.

19. The pneumatic compactor according to claim 17, wherein the front tire skirt system includes a first skirt, and the rear tire skirt system includes a rear skirt, each of the first skirt and the second skirt being comprised of a plurality of distinct skirt sections separately removable from the tire skirt support assembly of the front tire skirt system and the tire skirt support assembly of the rear tire skirt system, respectively.

20. The pneumatic compactor according to claim 17, wherein the second end of the body of the skirt support member has a prong and a flange provided at an angle relative to each other, only one of the prong or the flange being configured to extend through the attachment opening of the skirt to removably engage the skirt, the other of the prong or the flange extending vertically in a same direction as the body.

* * * * *